United States Patent [19]

England, Jr.

[11] 4,033,651
[45] July 5, 1977

[54] DESK MOUNTING FOR TELEPHONE

[76] Inventor: Albert O. England, Jr., 5225 Gould Ave., La Canada, Calif. 91011

[22] Filed: Mar. 29, 1976

[21] Appl. No.: 671,330

[52] U.S. Cl. .................. 312/237; 179/100 R; 179/146 R
[51] Int. Cl.² .................. A47B 83/00; A04M 1/02
[58] Field of Search ....... 312/237; 179/178, 146 R, 179/100 R, 100 D, 100 L

[56] References Cited

UNITED STATES PATENTS

| 1,929,574 | 10/1933 | Armstrong | 179/146 R |
| 2,351,125 | 6/1944 | Henrikson | 179/146 R |
| 2,572,478 | 10/1951 | Hawkins | 179/178 |
| 3,384,718 | 5/1968 | Wilder | 179/100 D |
| 3,546,396 | 12/1970 | Marcheschi | 179/100 R |
| 3,602,565 | 8/1971 | England, Jr. | 179/146 R |
| 3,928,723 | 12/1975 | Kai | 179/100 L |

FOREIGN PATENTS OR APPLICATIONS 1,223,889  4/1966  Germany .................. 179/100 D Primary Examiner—Paul R. Gilliam
Assistant Examiner—Victor N. Sakran
Attorney, Agent, or Firm—Christie, Parker & Hale

[57] ABSTRACT

A desk or table top mounting for a cradle phone of the type having the dial and the handset. The base or cradle of the phone is mounted by a bracket below a panel. The panel has a plastic sheet forming a cover with a pair of spaced depressions formed in the sheet for receiving the earphone and voice pickup ends of the handset. The cradle is mounted beneath the panel with one end tilted upwardly so that the shutoff button projects through an opening in the bottom of one of the depressions. The phone is shut off by placing the handset in position in the depressions.

2 Claims, 3 Drawing Figures

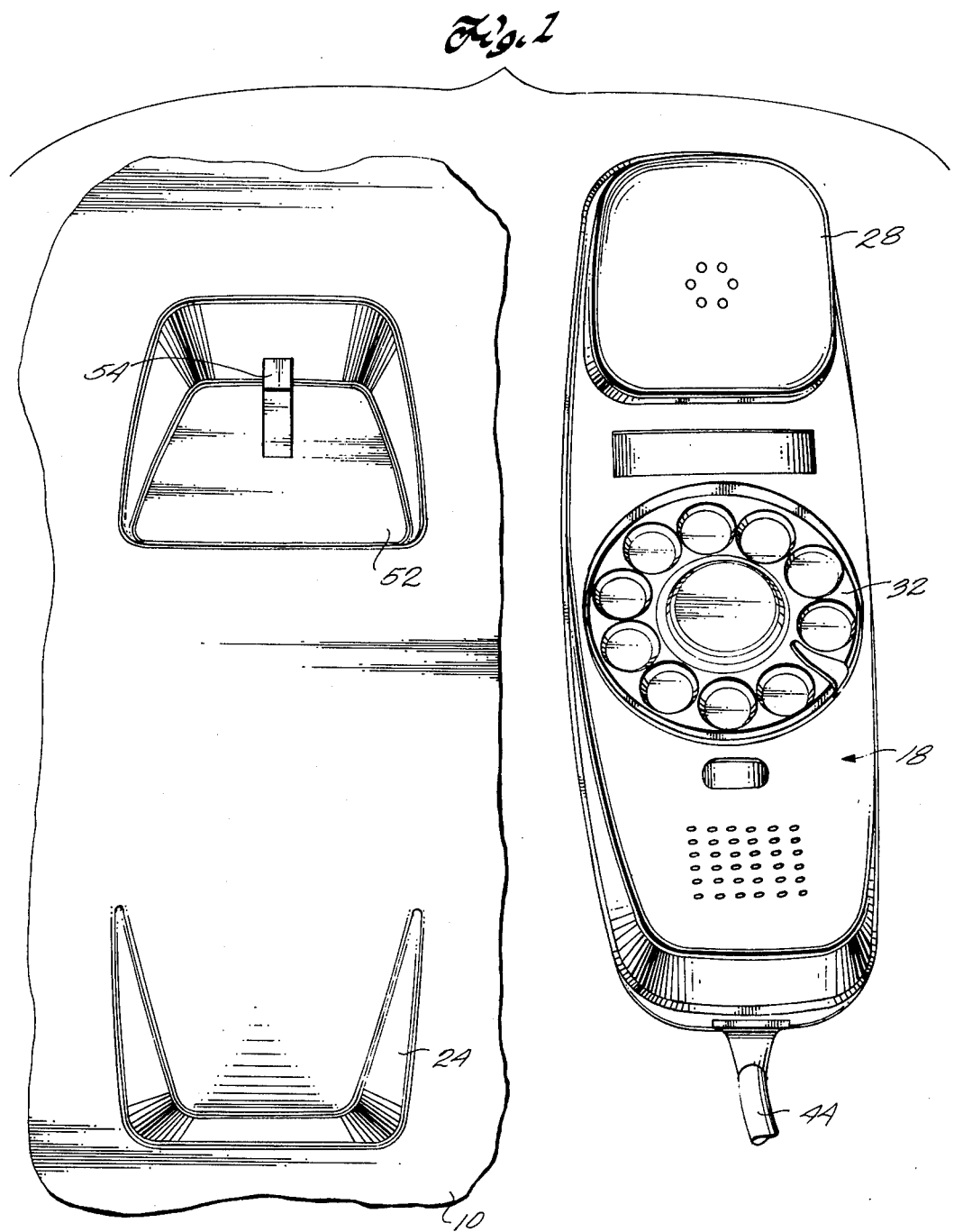

4,033,651

DESK MOUNTING FOR TELEPHONE

FIELD OF THE INVENTION

This invention relates to mountings for telephones, and more particularly, relates to a desk or table top enclosure for a telephone.

BACKGROUND OF THE INVENTION

In my U.S. Pat. No. 3,602,565 there is described an enclosure for a conventional commercial telephone which is adapted to be mounted in the top surface of a table or desk to conceal the base of the telephone without interfering with the normal use of the instrument and without requiring any adjustment, modification, or disassembly of the telephone. The present invention is directed to a modified mounting and enclosure for a telephone of the type having a base or cradle on which rests a handset, the handset including the dial positioned between the earphone and the voice pickup located at either end. Such phones are referred to by various manufacturers as "Trimline" or "Slimline" telephones.

SUMMARY OF THE INVENTION

In brief, the present invention provides a desk-top mounting which includes a flat supporting panel adapted to be mounted flush with the desk top, the panel having an elongated opening therein. A sheet of plastic covering extends over the top surface of the panel and the elongated opening. The plastic sheet has a pair of spaced depressions molded or otherwise formed in the plastic which extend into the opening in the panel. The depressions are adapted to receive the voice pickup and earphone ends, respectively, of the handset. A bracket secured to the underside of the panel supports the base or cradle of the phone at an angle to the panel with one end of the cradle tilted upwardly so that the shutoff button is positioned adjacent one of the depressions and extends through an opening in the cover at the bottom of the depression. Thus the handset, when positioned in the depressions, engages the shutoff button. Thus the cradle is mounted out of sight beneath the cover while the handset rests on top of the cover in the depressions molded in the cover.

DESCRIPTION OF THE DRAWINGS

For a better understanding of the invention reference should be made to the accompanying drawings, wherein:

FIG. 1 is a perspective view of the top of the enclosure;

DETAILED DESCRIPTION

Figure 2:
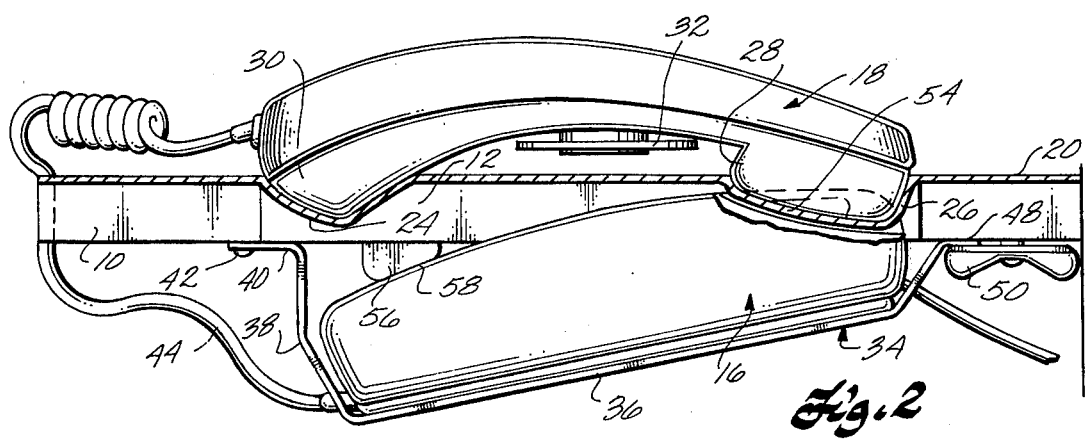
FIG. 2 is a sectional view showing the telephone in mounted position.

Referring to the drawings in detail, the numeral 10 indicates generally a substantially square panel of, for example, three-quarter inch plywood board. The panel 10 is formed with a centrally located rectangular opening 12. The dimensions of the opening are slightly in excess of the length and width of the base or cradle of a standard Trimline telephone of the type having a dial or push buttons incorporated in the handset. The phone cradle of such a telephone is indicated generally at 16 and the handset is indicated generally at 18 in FIG. 2.

Overlying the top surface of the panel 10 is a sheet 20 of suitable plastic bonded to the surface of the panel. The plastic sheet 20 forms a decorative and protective cover extending over the opening 12. The plastic sheet is molded with a pair of spaced depressions 24 and 26 which extend downwardly into the opening 12. The depressions 24 and 26 are shaped and spaced to conform with the shape of the voice pickup end and the earphone end, respectively, of the handset 18. The handset 18 is formed in an arc so that when held in the hand, the earphone portion, indicated at 28, can be placed against a person's ear while the voice pickup end, indicated at 30, curves around in front of the face so as to be positioned adjacent the person's mount. A dial 32 or push buttons is located in the handset between the earphone 28 and the voice pickup 30.

Figure 3:
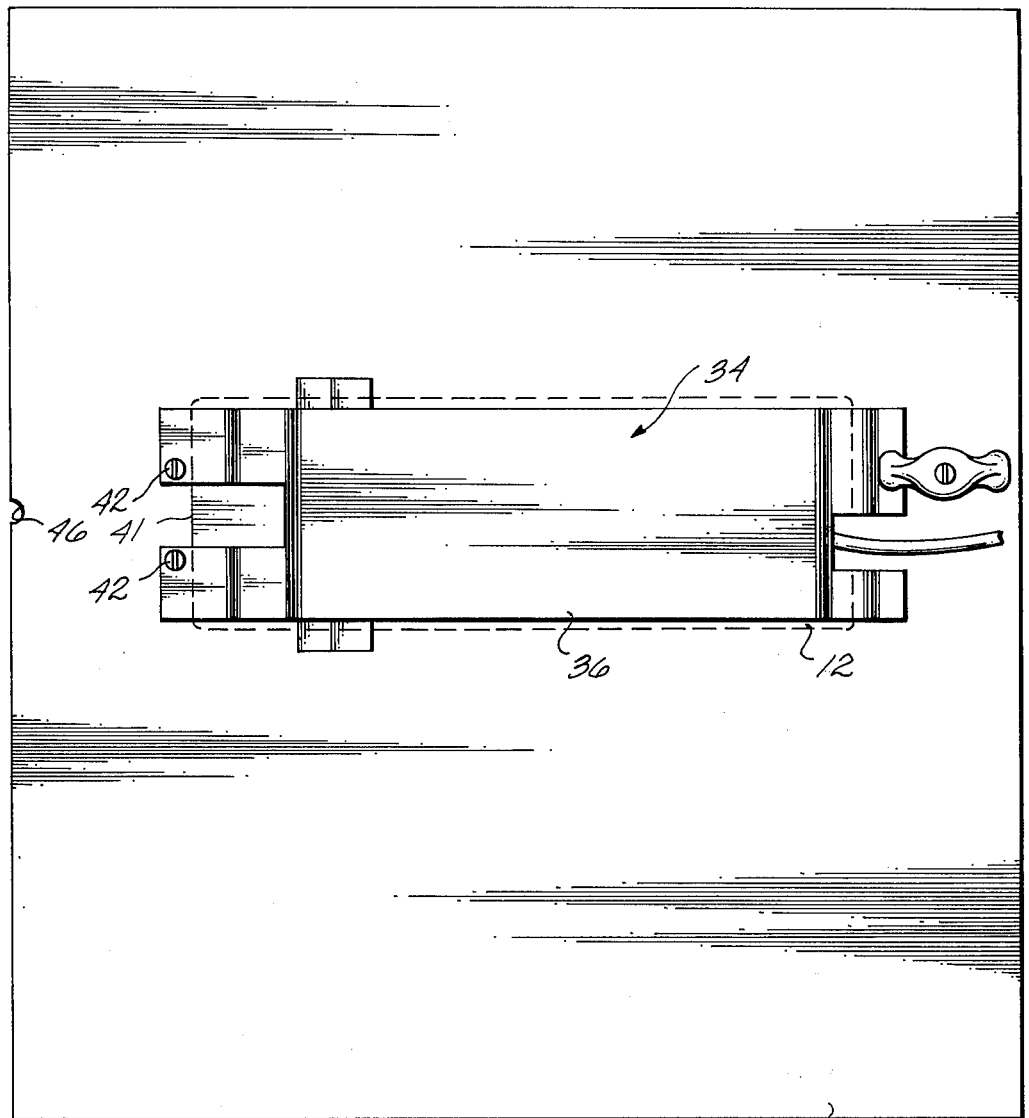
FIG. 3 is a plan view of the bottom side of the enclosure.

The phone cradle or base 16 is supported by a bracket 34 in the form of a wide sheet-metal strap having an elongated straight portion 36 on which the supporting surface of the phone cradle 16 rests. The portion 36 extends at an angle to the panel 10. The bracket 34 includes a bent end portion 38 terminating in a flange 40 which is screwed or otherwise fastened to the bottom surface of the panel 10, as by screws 42. As seen in FIG. 3, the end portion 38 and flange 40 are bifurcated leaving an opening 41 through which the cord 44 extending between the cradle 16 and handset 18 is directed. The edge of the panel is provided with the notch 46 through which the cord 44 also passes between the underside and top of the panel.

The other end of the bracket 34 has a flange portion 48 which is clamped against the undersurface panel 10 by a rotary catch 50. By rotating the catch 50, the flange 48 is released, allowing the bracket 34 to be easily removed. The screws 42 in the bifurcated flange 40 engage slots in the edge of the flange 40, permitting the bracket to be withdrawn without removal of the screws 42.

By virtue of the angular position of the straight portion 36 of the bracket 34, the phone cradle 16 is supported in an inclined position with one end being elevated and extending up into the opening 12 of the panel 10. The standard phone cradle 16 is molded with depressions for normally receiving the two ends of the handset 18 when the telephone is not in use. One of these depressions normally receiving the earphone portion 28 of the handset 18 has a spring-actuated shutoff button 52 which is depressed by the weight of the handset 18, switching off the telephone when it is not in use. The depression of the phone cradle with the shutoff button 52 is elevated upwardly against the underside of the depression 26 in the plastic cover 20. A slotted opening 54 in the depression 26 receives the shutoff button 52, allowing the button to extend through the plastic sheet 20 into position to be engaged by the earphone 28 of the handset 18. A positioning bar 56 bridges the opening 12 across the undersurface of the panel 10. The positioning bar has a beveled surface 58 which contacts the top of the phone cradle 16, clamping the phone cradle securely in position when the bracket is secured in place. The bent end portion 38 of the bracket 34 flexes, acting as a spring to urge the phone cradle against the surface 58 of the positioning bar 56, thereby securely locking the phone cradle in position.

From the above description it will be seen that a telephone mounting arrangement is provided which covers the phone cradle, leaving only the handset resting directly on top of the mounting panel. The panel can be mounted in a desk or table top so that the plastic sheet forming the cover 20 is flush with the top surface. The handset is readily held in stored position when not in use by the depressions formed in the plastic sheet. At the same time, the phone cradle is mounted beneath the panel in position such that the shutoff button is available to be actuated by the handset when not in use. The plastic cover forms a decorative and functional surface for holding the handset when not in use, yet providing easy access to the handset while hiding completely the cradle part of the phone.

What is claimed is:

1. Apparatus for providing a desk-top mounting of a phone of the type having a cradle and handset removably resting on the cradle when not in use, the handset having a dial between the pickup and earpiece ends of the handset, the cradle having a shutoff button projecting therefrom in a position to be engaged and depressed by the handset when placed on top of the cradle, comprising a flat supporting panel adapted to be mounted flush with the desk top, the panel having an elongated opening therein, a thin plastic sheet overlying the top surface of the panel and the elongated opening, the sheet having a pair of integrally formed spaced depressions formed therein extending into said opening, the depressions being adapted to receive the pickup and earphone ends respectively of the handset, one of said depressions having a small opening through the sheet for receiving the shutoff button of the cradle, a bracket detachably secured to the underside of the panel for supporting the cradle of the phone, the bracket holding the cradle at an acute angle to the panel with the portion having the shutoff button extending up into said opening in the panel adjacent one end of the elongated opening and with only the shutoff button projecting up through the opening in the plastic sheet, whereby the handset, when positioned in said depressions, engages the shutoff button, and a positioning bar secured to the under side of said panel and extending across the elongated opening adjacent the other end, the bar having a surface engaging the top of the cradle to clamp the cradle between the supporting bracket and the bar.

2. Apparatus of claim 1 wherein the bracket includes a spring portion which is deflected when the bracket clamps the cradle against the support bar.

* * * * *